United States Patent [19]
Estaun

[11] Patent Number: 5,887,508
[45] Date of Patent: Mar. 30, 1999

[54] COFFEE MAKER OPERATING WITH DIFFERENT TYPES OF RECEPTACLES

[75] Inventor: Alain Estaun, Lourdes, France

[73] Assignee: SEB S.A., Ecully, France

[21] Appl. No.: 876,334

[22] Filed: Jun. 16, 1997

[30] Foreign Application Priority Data

Jun. 17, 1996 [FR] France .................................. 96 07891

[51] Int. Cl.⁶ ........................................................ A47J 31/46
[52] U.S. Cl. ................................. 99/279; 99/284; 99/304
[58] Field of Search .............................. 99/279, 284, 299, 99/304, 306; 222/146.5, 146.2, 146.1

[56] References Cited

U.S. PATENT DOCUMENTS

| | | | |
|---|---|---|---|
| 5,127,318 | 7/1992 | Selby, III | 99/299 X |
| 5,473,973 | 12/1995 | Cortese | 99/299 X |
| 5,476,033 | 12/1995 | Locati | 99/279 |

FOREIGN PATENT DOCUMENTS

| | | |
|---|---|---|
| 0 662 040 A1 | 5/1994 | European Pat. Off. . |
| 36 02 665 A1 | 8/1987 | Germany . |
| 37 42 930 C1 | 10/1988 | Germany . |
| 91 15 639 U | 3/1992 | Germany . |

*Primary Examiner*—Reginald L. Alexander
*Attorney, Agent, or Firm*—Pillsbury Madison & Sutro

[57] ABSTRACT

A hot beverage machine, in particular a coffee maker, having a filter holder provided with a first pouring device having an outlet orifice, and a second pouring device having at least two outlet orifices. The second pouring device is capable of occupying either an active position in which it is located beneath the orifice of the first pouring device, or a retracted position. The second pouring device also includes an actuating mechanism for moving it between the two positions by manual operation performed at a location remote from the first pouring device.

17 Claims, 3 Drawing Sheets

COFFEE MAKER OPERATING WITH DIFFERENT TYPES OF RECEPTACLES

BACKGROUND OF THE INVENTION

The present invention relates to the field of hot beverage machines, of the coffee maker type, permitting a user to collect a hot beverage either in a coffeepot, or carafe, or directly in at least one and preferably two cups preliminarily disposed in the machine by the user.

The present invention concerns more particularly a coffee maker of the mixed type comprising a housing with a filter holder provided with at least one outlet for liquid, and a retractable pouring means having at least two orifices, the position of this pouring means being selected by the user in a manner to be adapted to the type of receptacle or receptacles being utilized.

It has already been proposed, particularly as disclosed in German Utility Model Publication DE-U-9115639, to provide a filter coffee maker which permits the user to choose the type of receptacle into which it is desired to pour the hot coffee. In this device, the coffee maker comprises in a conventional manner a heating support for a coffeepot, or carafe, as well as a filter holder provided with drip-prevention means capable of being actuated by the carafe when this latter is placed on the support. In this position, the carafe displaces the drip-prevention means and permits the flow of coffee through an outlet orifice arranged in the filter holder. The coffee machine comprises in addition a filter holder on which is mounted in a movable manner a flow distributor intended to be moved pivotably into a work position by the user himself when it is desired to deliver the coffee directly into two cups and not into a carafe. The flow distributor is present in the form of a deflection plate provided with two orifices, the plate coming to activate the drip-prevention means in its working position in order to permit the flow of the coffee onto the plate and through the two outlet orifices.

Such a device could obviously permit the user to choose freely the receptacle into which he wishes the coffee to be delivered from the filter holder. However, this device adjacent to the filter holder is situated in its work position under the filter holder orifice. The user must directly manipulate a part in which hot coffee is circulating. In order to have the advantage of a better lever effect, he is led to manipulate the device preferably in its lower part, in which the hot coffee, in effect, circulates. The user thus is in danger of being burned or having his clothing soiled if coffee remains in the device.

In addition, the drip-prevention means which comes to bear on the central part of the device when the latter is in its working position requires that the user exert an effort in order to free the drip-prevention device. This effort leads to giving the movement an abrupt character, which mechanically urges in a significant manner the axis of rotation of the device. In order to better control the movement of the device, the user is led, in a preferential manner, to maneuver it with both hands. If he maneuvers the device by holding it in its central part, there is a risk that the user's fingers will strike the drip-prevention device which is coming into its closed position once the device is freed. It is thus seen that this device is not easy to use and that the user encounters risks of being burned or having his clothing stained with the coffee when maneuvering the device.

In addition, this device makes use of a mechanical assembly which is complicated and fragile. It requires in effect that the distribution device be supported by axes which are fragile and destined to be acted on frequently. Moreover, good operation of the device implies a good dimensional adjustment between the flow distribution device and the drip-prevention means which must be moved axially in order to free the evacuation orifice of the filter holder. Such an adjustment of the relative movements is not easy to obtain on an industrial scale on the one hand and is capable after several uses of becoming misadjusted, or even of experiencing deterioration.

In the European Patent Document EP-0622040 there is described a coffee maker comprising a drip-prevention means provided with two closing valves for two distinct liquid outlets, the drip-prevention means comprising a first control means capable of being activated automatically by the coffeepot when the latter is put in place, as well as a second control means capable of being activated preferably manually through the intermediary of a toothed wheel, in order to lead the drip-prevention means into a stable position for clearing the two liquid outlets. This device thus permits the user to recover the beverage in a coffeepot or in two receptacles such as cups. It presents, however, an annoyance to the user because it is not ergonomic. In effect, the action of the toothed wheel on the drip-prevention means provokes only a small displacement of the piece including the two liquid outlets. The user does not spontaneously detect the configuration in which the coffee maker has been placed and can have annoying experiences such as the flow of coffee upon premature withdrawal of the coffeepot, if the drip-prevention means has not been activated, or an apparent nonfunctioning if the drip-prevention means has been activated and the user wants to recover the coffee in one or two cups.

BRIEF SUMMARY OF THE INVENTION

Accordingly, it is an object of the present invention to provide a coffee maker which is constructed to remedy the inconveniences described above.

Another object of the invention is to provide a coffee maker which is capable of delivering coffee, based on a selection made by the user, either into a coffeepot or into one or several cups, by means of a simple manipulation.

Yet another object of the invention is to provide a coffee maker having a simple and sturdy structure.

The above and other objects are achieved by a hot beverage preparation machine comprising: a housing; a filter holder installed in the housing and provided with a first pouring means that includes a first outlet orifice via which liquid can flow out of the filter holder; and second pouring means having at least two second outlet orifices, the second pouring means being movable between an active position below the first outlet orifice and a retracted position in which the second pouring means are removed from below the first outlet orifice, wherein the second pouring means comprise actuating means for controlling movement of the second pouring means between the active position and the retracted position by a manual operation performed at a distance from the first pouring means.

With the hot beverage machine according to the present invention, the user can act on actuating means to change the position of the second pouring means without having to manipulate the latter directly and without running the risk of spilling the coffee, being burned, or even overturning a cup as a result of an awkward or careless motion. When the second pouring means is placed under the orifice of the first pouring means, the beverage flows into the receptacle or receptacles placed under the orifices of the second pouring means. When the second pouring means is placed in its retracted position, the beverage flows from the orifice of the first pouring means into a coffeepot.

According to an advantageous form of construction of the invention, the actuating means comprise a lever located at a distance from the first pouring means and pivotable about a substantially perpendicular axis, the lever having a part connected to a rod which is itself connected to an element pivoting around another axis which is oriented substantially perpendicularly, the movement of the lever into a first position bringing the second pouring means into a retracted position, and the movement of the lever into a second position bringing the second pouring means into an active position where the means is in a prominent and visible position.

The user who looks at the beverage making machine in order to place a selected receptacle or receptacles thus knows immediately if the configuration of the machine corresponds to the receptacle or receptacles that he wishes to utilize. If this is not the case, the user moves the actuating lever to the appropriate position. The lever is disposed at a distance from the first pouring means. Being at a distance means that the lever is disposed outside of the pouring zone, or the immediate zone occupied by the flow of coffee. Thus, preferably, the lever is provided in a manner to present a projection which is accessible from one of the faces of the machine, for example the front face. It would of course be possible to provide the lever at another location, for example on the top of the filter holder, in a manner to be accessible from the top, far from the pouring zone.

Advantageously, the actuating means are constituted by a single piece.

The device thus produced makes use of a simple mechanical assembly permitting the user to select the desired position by the simple movement of a lever. The parts of the device can be made in a convenient manner by molding. This device has the advantage of being inexpensive and easily installed during assembly of the appliance.

According to an advantageous form of construction of the invention, a part of the lever is connected to the rod by a first section having a reduced thickness permitting a significant flexure, the rod being connected to a transmission element by a second section having a reduced thickness permitting a substantial flexure.

Advantageously, the actuating means are placed between the wall of the filter holder and the housing, a window provided in the front part of the housing permitting activation of the lever.

Further according to an advantageous form of construction of the invention, the first pouring means comprises a drip-prevention means capable of being rocked into a retracted position by the second pouring means during its passage into the active position, thus freeing the orifice of the first pouring means.

A machine thus produced according to the invention permits the function of a machine equipped with drip-prevention components where the beverage is collected in a carafe to be combined with that of a machine constructed to directly deliver the beverage into one or several receptacles.

In an advantageous manner, the actuating means are made of polymer material.

In order to provide a clearer understanding of the invention, there will be presented below a description of a preferred embodiment, presented by way of nonlimiting example, presented with reference to the accompanying drawings.

DETAILED DESCRIPTION OF THE INVENTION

Figure 3:
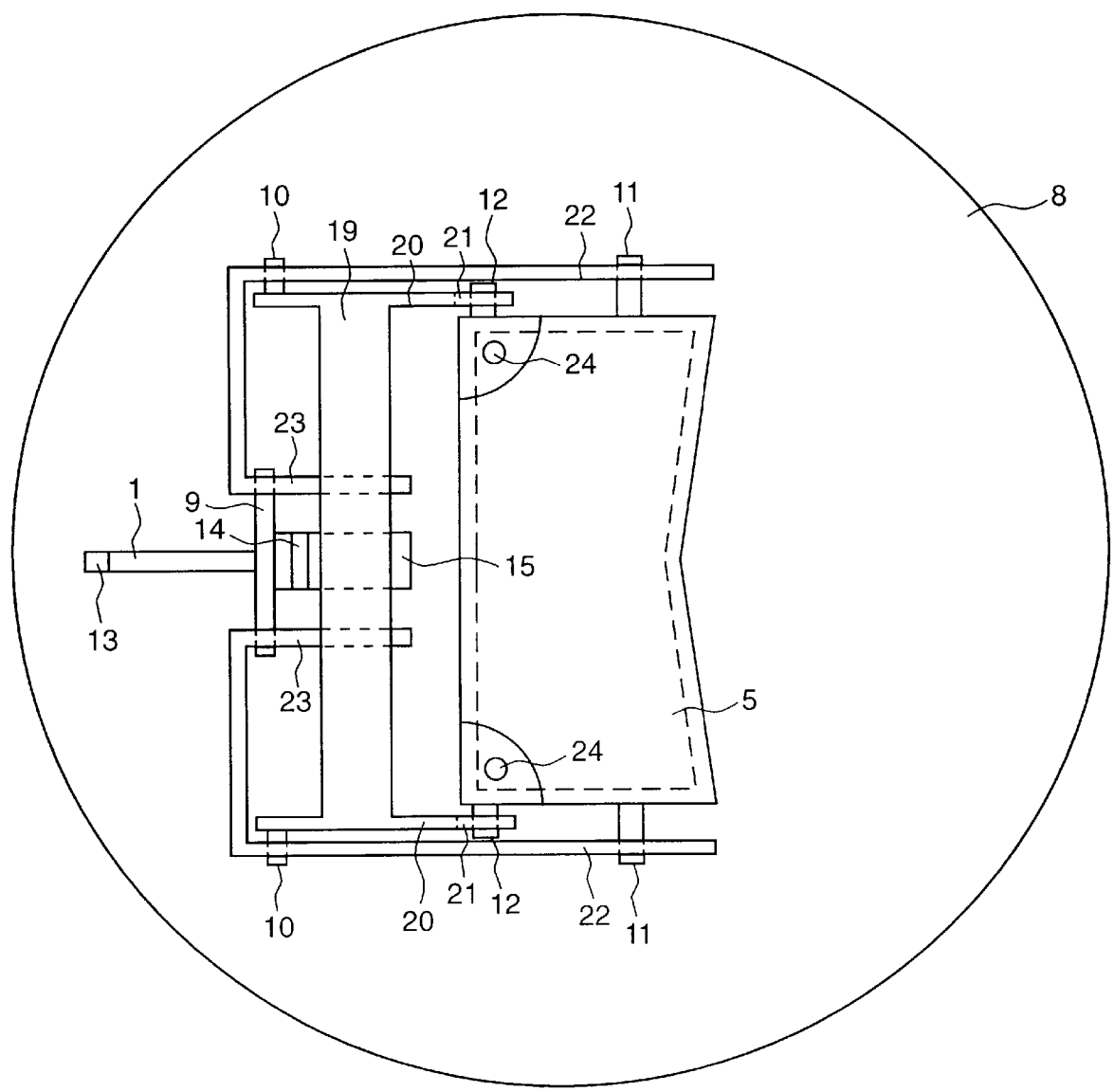
FIG. 3 is a bottom plan view of a portion of a machine according to the invention in which the second pouring means is in its active position.
Figure 5:
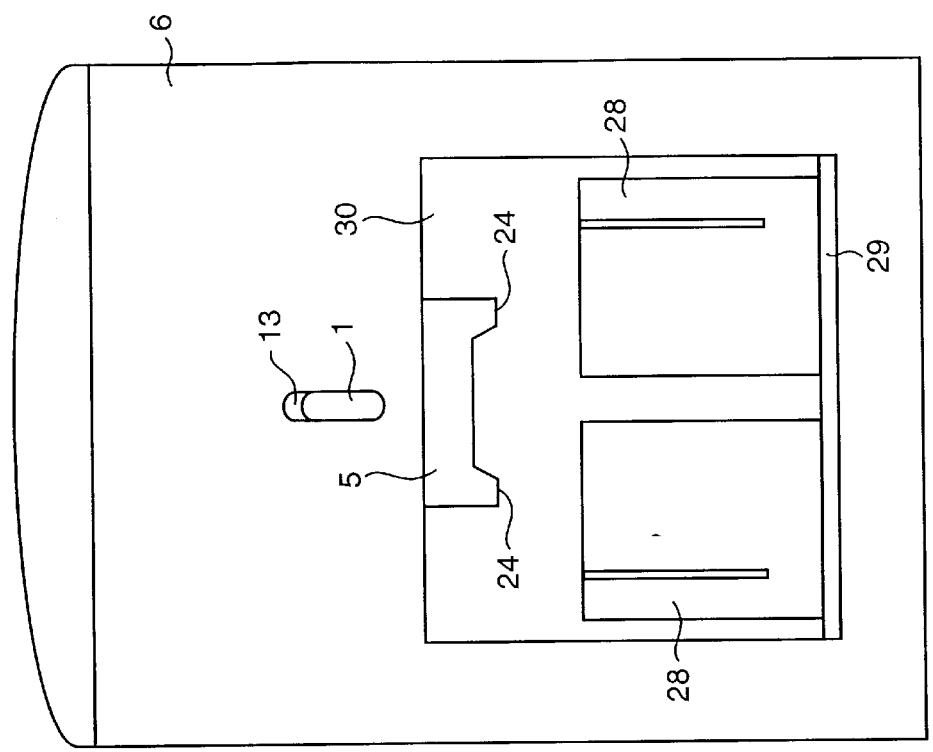
FIG. 5 is a view similar to that of FIG. 4 in which the second pouring means is in its active position.
Figure 4:
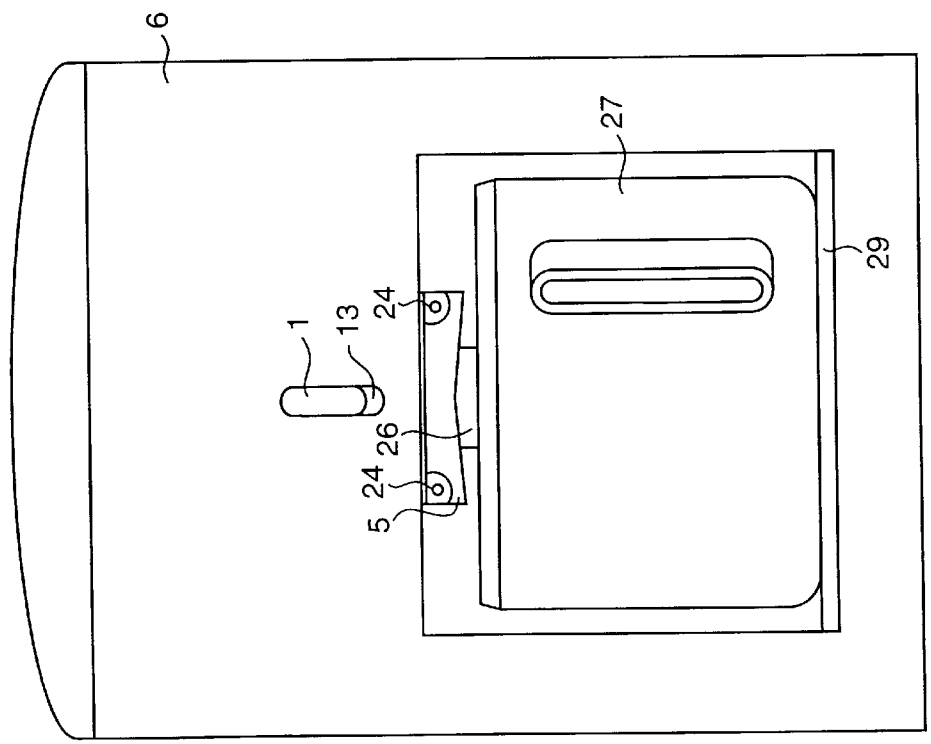
FIG. 4 is a front elevational view of a machine according to the invention, in which view the second pouring means is in its retracted position.

The embodiment of a beverage making machine which is illustrated in the drawing and which will be described below is a coffee maker which, as shown particularly in FIGS. 4 and 5, is composed, in a known manner, of a housing 6 containing a water reservoir, means for heating the water and means for conducting the heated water (not shown) to a location above the filter holder 8 (shown in FIGS. 1–3) and a support 29 for holding a receptacle or receptacles intended to receive the beverage from filter holder 8. The receptacle or receptacles can be constituted, for example, by a coffeepot 27 as shown in FIG. 4 or one or several cups 28 as shown in FIG. 5. Filter holder 8 is provided in its bottom with an outlet orifice 18, shown in FIGS. 1 and 2, via which beverage flows out of filter holder 8 and into a receptacle or receptacles installed on support 29.

Actuating means are preferably situated at the interior of housing 6, in front of a side wall 7 of filter holder 8. The actuating means are constituted by a lever 1, which is here preferably in the form of a thumb wheel having a circular sector which desirably includes a projecting portion 13 and a planar part 2 preferably extending radially at a location diametrically opposite projecting portion 13. Lever 1 is traversed by a pivot shaft 9 which extends in a direction substantially perpendicular to the plane of pivot shaft 1. Lever 9 preferably defines a horizontal pivot axis. A rod 3 which preferably has the same cross section as planar part 2 is connected to planar part 2 by a first hinge element 14 having a thickness which is less than that of planar part 2 and rod 3 to permit hinge element 14 to experience a substantial amount of flexing. A transmission element 4 preferably having the form of an H is linked to rod 3 by a second hinge element 15 having a thickness which is smaller than that of planar part 2 and rod 3 in order to permit hinge element 15 to undergo a substantial amount of flexing. Transmission element 4 is constituted by a central crosspiece 19 and two legs 20. Hinge element 15 is located, for example, at the level of cross piece 19. Each leg 20 carries a pivot member, in the form of a pin, 10 which extends outwardly from the external surface of its associated leg 20. Each leg 20 is also provided with a longitudinal groove 21. Lever 1 is advantageously disposed behind an opening, or port, 16 through which projects projecting portion 13 for access by a user. Opening 16 is preferably located in the frontal part of housing 6.

The second pouring means 5 is in the form of a chamber having a bottom which is pierced preferably by two orifices 24. Second pouring means 5 has the form of a container provided with two upwardly extending side portions each provided with a first pivot member 11 and a second pivot member 12. Second pivot members 12 cooperate with transmission element 4, pivot members 12 preferably engaging in respective longitudinal grooves 21 in legs 20 of transmission element 4. When second pouring means 5 is in its active position, it is clearly observable by the user because it projects downwardly into the opening, or recess, 30 provided for receiving a receptacle or receptacles, 27, 28, as shown most clearly in FIG. 5.

Advantageously, filter holder 8 includes, in the part thereof facing the front of the machine, two parallel walls 22 each having a first opening, or through hole, for receiving a respective pivot member 10 of transmission element 4. In addition, each of walls 22 has a second opening, or through hole, provided to receive a respective pivot member 11 of second pouring means 5. Furthermore, each of walls 22 is provided with a respective support element 23 having a recess or bore for receiving a respective end of pivot shaft 9 of lever 1.

Figure 1:
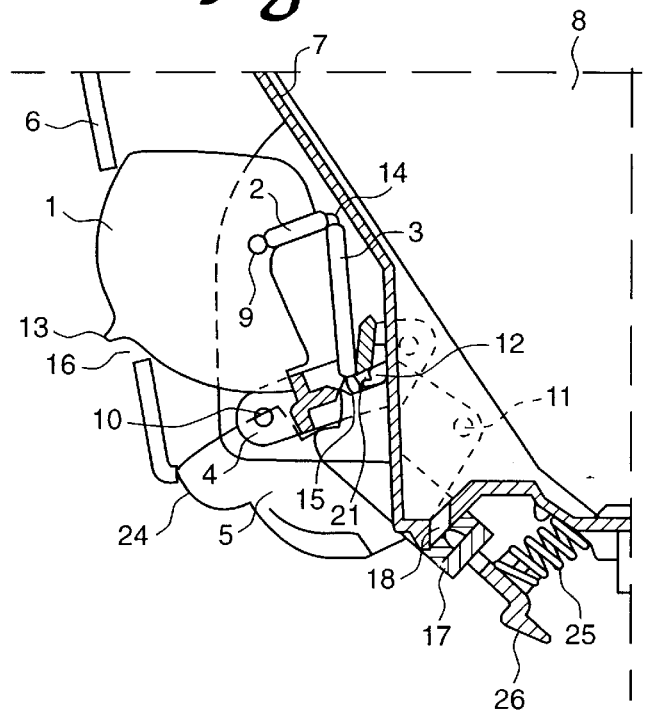
FIG. 1 is an elevational cross-sectional detail view of a portion of a machine according to the invention, in which the second pouring means is in its retracted position.
Figure 2:
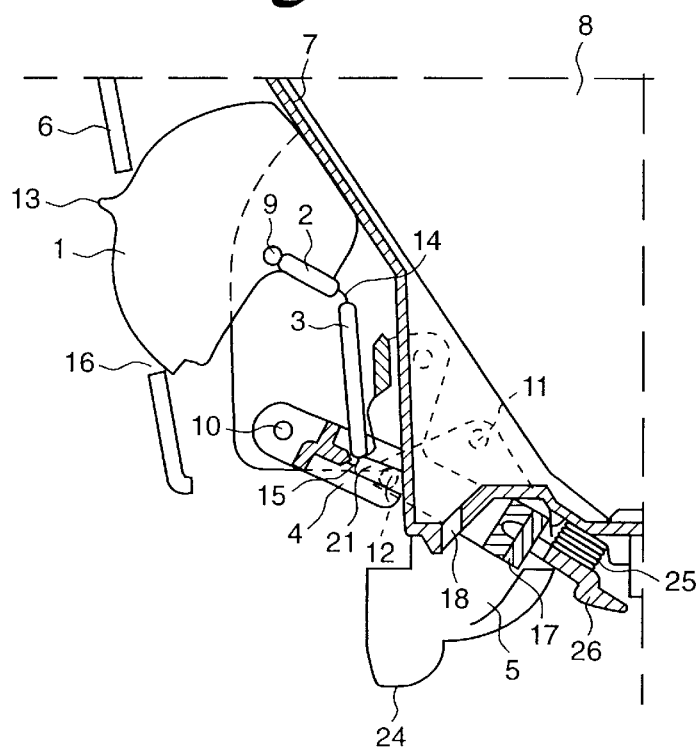
FIG. 2 is a view similar to that of FIG. 1 in which the second pouring means is in its active position.

In an advantageous manner, a machine according to the invention includes a drip-prevention means 17 which blocks the outlet orifice 18 of filter holder 8 with the aid of a restoring means 25, for example a spring, when second pouring means 5 is placed in its retracted position, as shown in FIG. 1. When second pouring means 5 is in its active position, it cooperates with a control element 26 of drip-prevention means 17 and unblocks outlet orifice 18, as shown in FIG. 2.

It will be noted that according to one feature of the present invention, lever 1, planar part 2, rod 3, transmission element 4, pivot shaft 9, pivot member 10, hinge element 14 and hinge element 15 are all integral parts of a one-piece member, or component. It will be appreciated, however, that various manufacturing limitations may require that these parts be made of two or more one-piece components which are suitable secured together. However, when all of the parts mentioned above are integral parts of a one-piece component, the overall manufacturing and assembly process can be facilitated.

The machine according to the invention functions in the following manner:

In FIGS. 1 and 4 the projecting portion 13 of lever 1 is shown in its lower position. Second pouring means 5 is in its retracted position. The user places a coffeepot 27 in such a manner that the coffeepot 27 comes to cooperate with a control element 26 of the drip-prevention means 17 to place said means in its retracted position. The user thus collects the beverage, for example coffee, flowing via outlet orifice 18 in coffeepot 27. When the user withdraws coffeepot 27, restoring means 25 brings control element 26 of drip-prevention means 17 into a position blocking outlet orifice 18. Thus any coffee remaining in filter holder 8 does not escape if coffeepot 27 is not in the appropriate position on support 29.

In FIGS. 2 and 5, projecting portion 13 of lever 1 can be seen in its upper position. Second pouring means 5 is in its active position, visible in an obvious and precise manner by the user. Preferably, the user places two cups 28 under the orifices 24 of second pouring means 5. Coffee, or other beverage, flows as it is produced into cups 28, drip-prevention means 17 being in its retracted position. The user can also dispose a single receptacle in a manner to collect the beverage flowing out of the two orifices 24.

The passage of second pouring means 5 from the retracted position illustrated in FIGS. 1 and 4 to an active position illustrated in FIGS. 1 and 5 is achieved by displacing lever 1 into its raised position by acting manually on projecting portion 13. Rotation of lever 1 when projecting portion 13 is subjected to an upward movement correspondingly entrains planar part 2 downwardly. This rotation of lever 1 corresponds to a clockwise rotation from the position shown in FIG. 1. This movement is transmitted to rod 3 by the first hinge element 14, which provokes a rotation movement of transmission element 4 around the axis of pivot member 10 by the intermediary of the second hinge element 15. The rotational movement of transmission element 4 in the clockwise direction provokes a rotation in a counterclockwise direction of the second pouring means 5 toward its active position through the intermediary of the contact of pivot members 12 in longitudinal grooves 21.

Inversely, passage of second pouring means 5 from the active position illustrated in FIGS. 2 and 5 to the retracted position illustrated in FIGS. 1 and 4 is achieved by moving lever 1 into the lower position by acting manually on projecting portion 13. Rotation of lever 1 when projecting portion 13 is subjected to a downward movement correspondingly entrains planar part 2 upwardly. This rotation of lever 1 corresponds to a rotation in the counterclockwise direction as seen in the plane of FIG. 2. The movement is transmitted to rod 3 by transmission element 4. The rotation movement of transmission element 4 in the counterclockwise direction provokes rotation in the clockwise direction of second pouring means 5 toward its retracted position through the intermediary of the contact of pivot members 12 in grooves 21.

The invention is not in any way limited to the embodiment described herein, but encompasses numerous modifications or improvements. Particularly, one can envision that the number of orifices of the second pouring means are different, for example one orifice or three orifices. One can equally envision for example that the control lever is situated at the top of the housing or at a face of the housing other than its front face.

This application relates to subject matter disclosed in French Application number 96 07891, filed on Jun. 17, 1996, the disclosure of which is incorporated herein by reference.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. Hot beverage preparation machine comprising:
   a housing;
   a filter holder installed in said housing and provided with a first pouring means that includes a first outlet orifice via which liquid can flow out of said filter holder; and
   second pouring means having at least two second outlet orifices, said second pouring means being movable between an active position below said first outlet orifice and a retracted position in which said second pouring means are removed from below said first outlet orifice, wherein said machine comprises actuating means mounted in said housing and including a manually operable member located at a distance from said first pouring means, said actuating means being operable for controlling movement of said second pouring means between the active position and the retracted position in response to manual operation of said manually operable member.

2. Machine according to claim 1 wherein said manually operable member is a pivot member located at a distance from said first pouring means, said pivot member being pivotable about a first axis, and said actuating means further comprise:

an elongate member having first and second ends, with said first end being flexibly connected to said pivot member; and a transmission element flexibly connected to said second end of said elongate member, said transmission element being pivotable about a second axis, said transmission element being coupled to said second pouring means for moving said second pouring means between the active position and the retracted position in response to movement of said pivot member between first and second positions.

3. Machine according to claim 2 wherein said pivot member, said elongate member and said transmission member are integral parts of a one-piece component.

4. Machine according to claim 3 wherein said actuating means further comprise first and second hinge members configured to have a high degree of flexibility and forming part of the one-piece component, said first hinge member connecting said pivot member to said elongate member and said second hinge member connecting said elongate member to said transmission member.

5. Machine according to claim 4 wherein said housing has a front part provided with an opening, said actuating means are disposed between said filter holder and said housing, and said pivot member protrudes out of said housing via said opening.

6. Machine according to claim 5 wherein said first pouring means comprise drip-prevention means movable between a blocking position for blocking flow of liquid through said first outlet orifice and a retracted position for permitting liquid to flow through said first outlet orifice, said drip-prevention means being coupled to said second pouring means so that said drip-prevention means is moved to the retracted position in response to movement of said second pouring means to the active position.

7. Machine according to claim 6 wherein said actuating means are made of a polymer material.

8. Machine according to claim 4 wherein said first pouring means comprise drip-prevention means movable between a blocking position for blocking flow of liquid through said first outlet orifice and a retracted position for permitting liquid to flow through said first outlet orifice, said drip-prevention means being coupled to said second pouring means so that said drip-prevention means is moved to the retracted position in response to movement of said second pouring means to the active position.

9. Machine according to claim 3 wherein said first pouring means comprise drip-prevention means movable between a blocking position for blocking flow of liquid through said first outlet orifice and a retracted position for permitting liquid to flow through said first outlet orifice, said drip-prevention means being coupled to said second pouring means so that said drip-prevention means is moved to the retracted position in response to movement of said second pouring means to the active position.

10. Machine according to claim 3 wherein said housing has a front part provided with an opening, said actuating means are disposed between said filter holder and said housing, and said pivot member protrudes out of said housing via said opening.

11. Machine according to claim 2 wherein said housing has a front part provided with an opening, said actuating means are disposed between said filter holder and said housing, and said pivot member protrudes out of said housing via said opening.

12. Machine according to claim 2 wherein said first pouring means comprise drip-prevention means movable between a blocking position for blocking flow of liquid through said first outlet orifice and a retracted position for permitting liquid to flow through said first outlet orifice, said drip-prevention means being coupled to said second pouring means so that said drip-prevention means is moved to the retracted position in response to movement of said second pouring means to the active position.

13. Machine according to claim 1 wherein said first pouring means comprise drip-prevention means movable between a blocking position for blocking flow of liquid through said first outlet orifice and a retracted position for permitting liquid to flow through said first outlet orifice, said drip-prevention means being coupled to said second pouring means so that said drip-prevention means is moved to the retracted position in response to movement of said second pouring means to the active position.

14. Machine according to claim 1 wherein said actuating means are made of a polymer material.

15. Machine according to claim 1 wherein said actuating means further comprise a connecting member connected between said manually operable member and said second pouring means for transmitting movements of said manually operable member to said second pouring means.

16. Machine according to claim 1 wherein said manually operable member is mounted to pivot about an axis that is located above said second pouring means.

17. Machine according to claim 1 wherein said manually operable member is located at a distance from said second pouring means.

* * * * *